United States Patent
Basheer et al.

(10) Patent No.: US 10,652,171 B2
(45) Date of Patent: May 12, 2020

(54) MULTI-PROFILE CHAT ENVIRONMENT

(71) Applicant: American Express Travel Related Services Company, Inc., New York, NY (US)

(72) Inventors: Sibish Basheer, Phoenix, AZ (US); John Bruno, Scottsdale, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 107 days.

(21) Appl. No.: 15/909,560

(22) Filed: Mar. 1, 2018

(65) Prior Publication Data

US 2019/0273701 A1 Sep. 5, 2019

(51) Int. Cl.
| | |
|---|---|
| *H04L 12/58* | (2006.01) |
| *H04L 29/06* | (2006.01) |
| *G06F 17/28* | (2006.01) |
| *H04L 29/08* | (2006.01) |
| *G06F 16/951* | (2019.01) |

(52) U.S. Cl.
CPC ............ *H04L 51/02* (2013.01); *G06F 16/951* (2019.01); *G06F 17/28* (2013.01); *H04L 65/403* (2013.01); *H04L 67/306* (2013.01)

(58) Field of Classification Search
CPC ..... H04L 51/02; H04L 65/403; H04L 67/306; G06F 16/951; G06F 17/28
See application file for complete search history.

(56) References Cited

U.S. PATENT DOCUMENTS

| | | | |
|---|---|---|---|
| 2013/0326375 A1 | 12/2013 | Barak et al. | |
| 2017/0324866 A1 | 11/2017 | Segre et al. | |
| 2017/0324867 A1* | 11/2017 | Tamblyn | H04M 3/5191 |
| 2017/0324868 A1* | 11/2017 | Tamblyn | H04M 3/5191 |
| 2018/0367483 A1* | 12/2018 | Rodriguez | H04L 65/60 |
| 2018/0367484 A1* | 12/2018 | Rodriguez | G06Q 10/101 |

FOREIGN PATENT DOCUMENTS

WO 2012166197 8/2012

OTHER PUBLICATIONS

International Search Report and Written Opinion dated Mar. 29, 2019 in PCT Application No. PXT/US2019/012842.
International Report on Patentability dated Oct. 7, 2019 in PCT Application No. PCT/US2019/012842.

* cited by examiner

*Primary Examiner* — Arvin Eskandarnia
(74) *Attorney, Agent, or Firm* — Thomas | Horstemeyer, LLP

(57) ABSTRACT

A multi-profile chat system may receive a chat request comprising a user identifier and chat data. The system may process the chat data to determine a chat profile request, a request topic, and/or a request sentiment. The system may retrieve a user profile and/or a user chat record based on the user identifier. The system may determine a chat profile based on the chat profile request, the request topic, the request sentiment, the user profile, and/or the user chat record. The system may generate a chat response based on the chat request and the chat profile.

20 Claims, 4 Drawing Sheets

MULTI-PROFILE CHAT ENVIRONMENT

FIELD

The disclosure generally relates to an automated chat environment, and more specifically, to systems and methods for an automated chat environment employing one or more chat profiles.

BACKGROUND

Chat systems (e.g., a conversational artificial intelligence, chatbot, talkbot, chatterbot, etc.) may be used to conduct automated textual or auditory conversations with users. For example, chat system may typically be used in dialog systems for various purposes including customer service, information acquisition, or the like. Chat systems may be designed to simulate how a human would behave as a conversational partner. However, typical chat systems employ a single personality or no personality at all. Chat systems also interact with all users in a similar manner regardless of how the user is interacting with or responding to the chat system.

SUMMARY

Systems, methods, and articles of manufacture (collectively, the "system") for a multi-profile chat environment are disclosed. The system may receive a chat request. The system may process the chat request to determine at least one of a chat profile request, a request topic, or a request sentiment. The system may determine a chat profile based on at least one of the chat profile request, the request topic, or the request sentiment. The system may generate a chat response based on the chat request and the chat profile.

In various embodiments, the chat request may comprise a user identifier, and at least one of a user profile or a user chat record is retrieved based on the user identifier. The system may determine the chat profile based on at least one of the user profile or the user chat record.

In various embodiments, the system may receive a second chat request. The system may process the second chat request to determine at least one of a second chat profile request, a second request topic, or a second request sentiment. The system may evaluate at least one of the second chat profile request, the second request topic, or the second request sentiment to determine whether to select a second chat profile. The system may generate a second chat response based on the second chat request. In response to selecting the second chat profile, the second chat response may be generated based on the second chat profile. In response to the system not selecting the second chat profile, the second chat response may be generated based on the chat profile.

In various embodiments, the system may generate user chat data. The system may analyze the user chat data to determine whether to update the chat profile. In response to determining to update the chat profile the chat profile may be updated based on the analyzed user chat data. The user chat data may be analyzed based on machine learning, a big data analysis, a chat analysis, and/or a user chat record.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Figure 1:
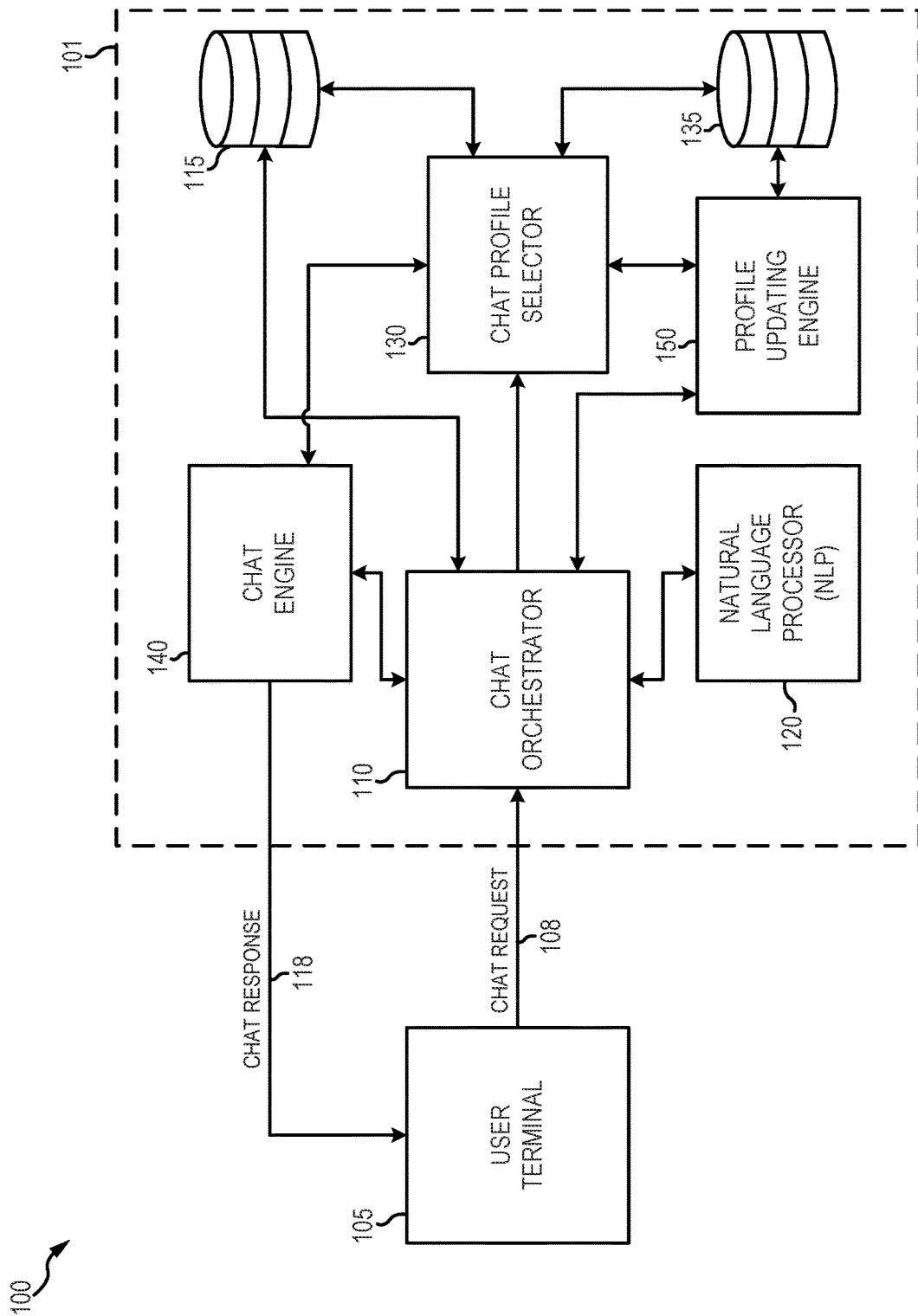
FIG. 1 is a block diagram illustrating various system components of a system for automated multi-profile chatting, in accordance with various embodiments.

In various embodiments, and with reference to FIG. 1, a system 100 for automated multi-profile chatting is provided. System 100 may provide a chat interface capable of employing different chat profiles based on how the user is interacting with system 100. Each chat profile may exhibit different behaviors and traits that control how system 100 responds and interacts with users during the chat. System 100 may be configured to intelligently select a chat profile based on the user's temperament, past chat interactions, the request being submitted to the system, and/or any other suitable factor, as discussed further herein. System 100 may also contemplate uses in association with web services, utility computing, pervasive and individualized computing, security and identity solutions, autonomic computing, cloud computing, commodity computing, mobility and wireless solutions, open source, biometrics, grid computing and/or mesh computing.

System 100 further improves the functioning of the computer. For example, by intelligently employing different and distinct chat profiles, system 100 may increase the user's experience and reduce the time needed to resolve a user's chat request. Thus, the user performs less computer functions and provides less input, which saves on data storage and memory which speeds processing. By reducing the time needed to resolve a user's chat request, system 100 may also reduce the need for human intervention during the chat session, thus improving the overall resource utilization of the computer based system.

In various embodiments, system 100 may comprise a user terminal 105 in electronic communication with a multi-profile chat environment 101. User terminal 105 may be configured to allow a user to submit one or more chat requests 108 to multi-profile chat environment 101 and receive one or more chat responses 118 in response, as discussed further herein. In various embodiments, user terminal 105 may comprise any suitable hardware, software, and/or database components capable of sending, receiving, and storing data. For example, user terminal 105 may comprise a personal computer, personal digital assistant, cellular phone, smartphone (e.g., IPHONE®, BLACKBERRY®, and/or the like), kiosk, and/or the like. User terminal 105 may comprise an operating system, such as, for example, a WINDOWS® operating system, a Linux or Unix operating system, an APPLE® operating system, WINDOWS® mobile operating system, an ANDROID® operating system, APPLE® IOS®, BLACKBERRY® operating system, and the like. User terminal 105 may further comprise software to allow the user to interact (e.g., transmit chat requests 108 and receive chat responses 118) with multi-profile chat environment 101, such as, for example, an internet browser, mobile application, or the like.

In various embodiments, multi-profile chat environment 101 may be configured to receive one or more chat requests 108 from user terminal 105, generate one or more chat responses 118, and transmit the one or more chat responses 118 to user terminal 105. Multi-profile chat environment 101 may comprise a service powered by rules, machine learning, and artificial intelligence, enabling a user to interact via a chat interface (or the like) allowing multiple language support (e.g., English, French, Spanish, etc.). For example, multi-profile chat environment 101 may comprise a talkbot, chatbot, chatterbox, artificial conversational entity, and/or the like customized and/or configured for system 100, and capable of conducting an automated textual and/or auditory conversation with user terminal 105. As discussed further herein, multi-profile chat environment 101 may employ one or more chat profiles during the chat response to exhibit different behaviors and traits in generating the chat response 118. In that respect, multi-profile chat environment 101 may intelligently select and employ one or more chat profiles based on at least one of the chat request 108, a user profile, a user chat record, machine learning, big data analysis, or the like.

In various embodiments, multi-profile chat environment 101 may be computer based, and may comprise a processor, a tangible non-transitory computer-readable memory, and/or a network interface, along with other suitable system software and hardware components. Instructions stored on the tangible non-transitory memory may allow system 100 to perform various functions, as described herein.

In various embodiments, multi-profile chat environment 101 may comprise one or more of a chat orchestrator 110, a historical chat database 115, a natural language processor (NLP) 120, a chat profile selector 130, a profile registry 135, a chat engine 140, and/or a profile updating engine 150. The various orchestrators, processor, selectors, engines, systems, databases, registries, and the like in multi-profile chat environment 101 may be in direct logical communication with each other via a bus, network, and/or through any other suitable means, or may be individually connected, as described further herein. For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical multi-profile chat environment 101. For example, and in accordance with various embodiments, the individual components of multi-profile chat environment 101 may be interconnected via a network.

As used herein, the term "network" may include any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE® talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein.

The various system components may be independently, separately or collectively suitably coupled to the network via data links which includes, for example, a connection to an Internet Service Provider (ISP) over the local loop as is typically used in connection with standard modem communication, cable modem, DISH NETWORKS®, ISDN, Digital Subscriber Line (DSL), or various wireless communication methods. It is noted that the network may be implemented as other types of networks, such as an interactive television (ITV) network. Moreover, the system contemplates the transmission of information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing.

In various embodiments, chat orchestrator 110 may be configured as a central hub to receive, parse, and/or transmit data. In that regard, chat orchestrator 110 may comprise a computer-based system, a processor, or any other suitable hardware and/or software combination capable of receiving, parsing, and/or transmitting data. Chat orchestrator 110 may be in electronic and/or operative communication with historical chat database 115, NLP 120, chat profile selector 130, chat engine 140, profile updating engine 150, and/or user terminal 105. Chat orchestrator 110 may be configured to receive one or more chat requests 108 from user terminal 105, and direct communications in multi-profile chat environment 101, as discussed further herein.

Chat orchestrator 110 may also be configured to generate user chat data at the completion of every chat, and store the user chat data in historical chat database 115. The user chat data may comprise a historical record of each chat a user has participated in, as discussed further herein. Historical chat database 115 may comprise any suitable database or data structure described herein, and may be configured to store the user chat data grouped by user identifier.

In various embodiments, NLP 120 may comprise any suitable combination of hardware and/or software components, and may be powered by algorithms, machine learning, and artificial intelligence configured to enable NLP 120 to process and understand chat requests 108 received from chat orchestrator 110. NLP 120 may allow multiple language support (e.g., English, French, Spanish, etc.) and may process textual, auditory, and/or visual messages. For example, NLP 120 may be configured to process chat requests 108 to determine a chat profile request, a request topic, or a request sentiment, as discussed further herein. NLP 120 may be in electronic and/or operative communication with chat orchestrator 110.

In various embodiments, chat profile selector 130 may comprise any suitable combination of hardware and/or software components, and may be configured to determine and select one or more chat profiles to be used for the chat response. Chat profile selector 130 may be in electronic and/or operative communication with chat orchestrator 110, historical chat database 115, profile registry 135, chat engine 140, and/or profile updating engine 150. Chat profile selector 130 may be configured to retrieve one or more chat profiles from profile registry 135 based on processed chat data from NLP 120 and user identifying data corresponding to the user who submitted the chat request 108, as discussed further herein. Each chat profile may comprise artificial intelligence driven by rules or instructions configured to control the generation of chat responses 118, as discussed further herein. Profile registry 135 may comprise any suitable database or data structure described herein, and may be configured to store and maintain the chat profiles.

In various embodiments, chat engine 140 may comprise any suitable combination of hardware and/or software components, and may be configured to interact with user terminal 105. For example, chat engine 140 may be configured to generate a chat response 118 and transmit the chat response to user terminal 105, as discussed further herein. Chat engine 140 may be in electronic and/or operative communication with chat orchestrator 110, chat profile selector 130, and/or user terminal 105. Chat engine 140 may be configured to generate chat responses based on the selected chat profile. In that respect, the selected chat profile may control how chat engine 140 formulates each chat response 118, as discussed further herein.

In various embodiments, profile updating engine 150 may comprise any suitable combination of hardware and/or software components, and may be configured to retrieve and update chat profiles stored in profile registry 135. Profile updating engine 150 may be in electronic and/or operative communication with chat orchestrator 110, chat profile selector 130, profile registry 135. Profile updating engine 150 may be configured to analyze data regarding each chat to determine whether a selected chat profile needs to be updated, as described further herein. Profile updating engine 150 may analyze the chat data using any technique, such as, for example, machine learning, big data analysis, a chat analysis, and/or the historical user chat record.

Figure 2:
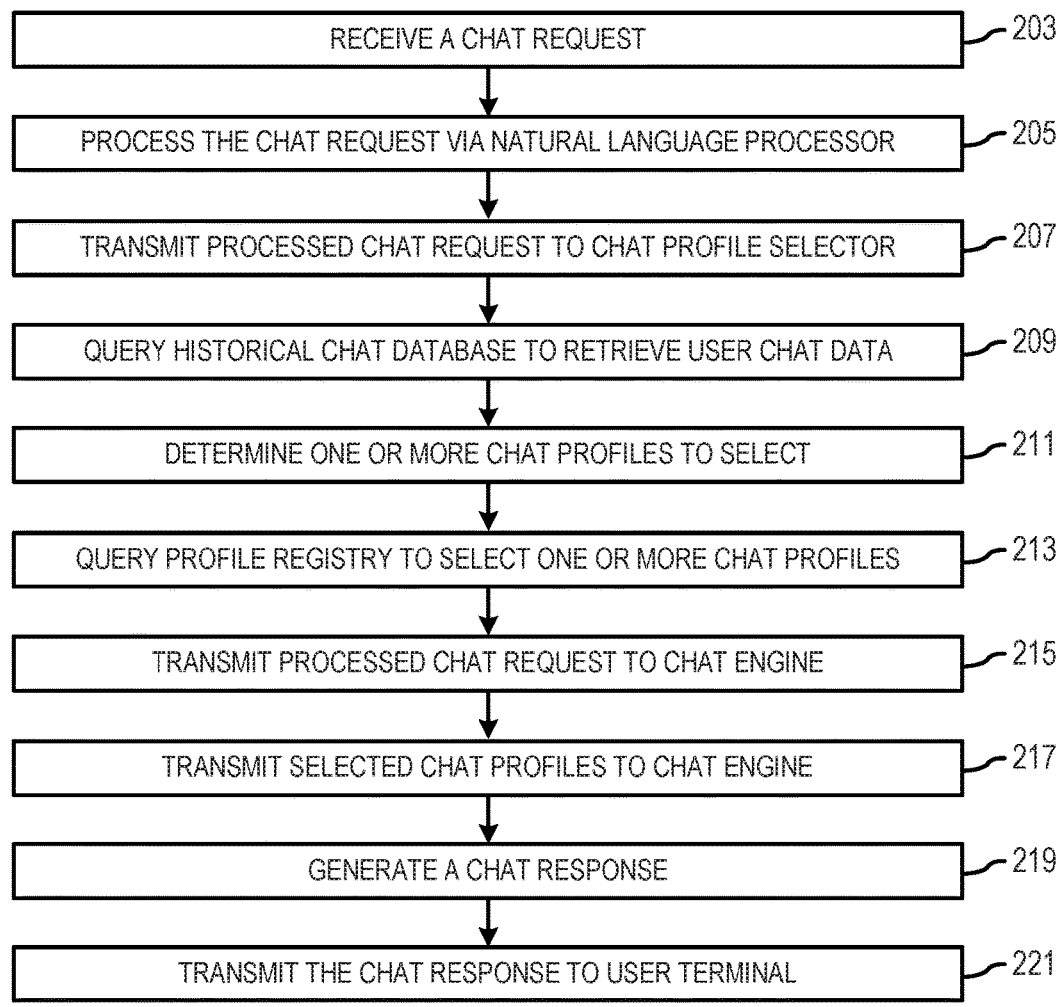
FIG. 2 illustrates a process flow for initializing one or more chat profile in a multi-profile chat environment, in accordance with various embodiments.
Figure 3:
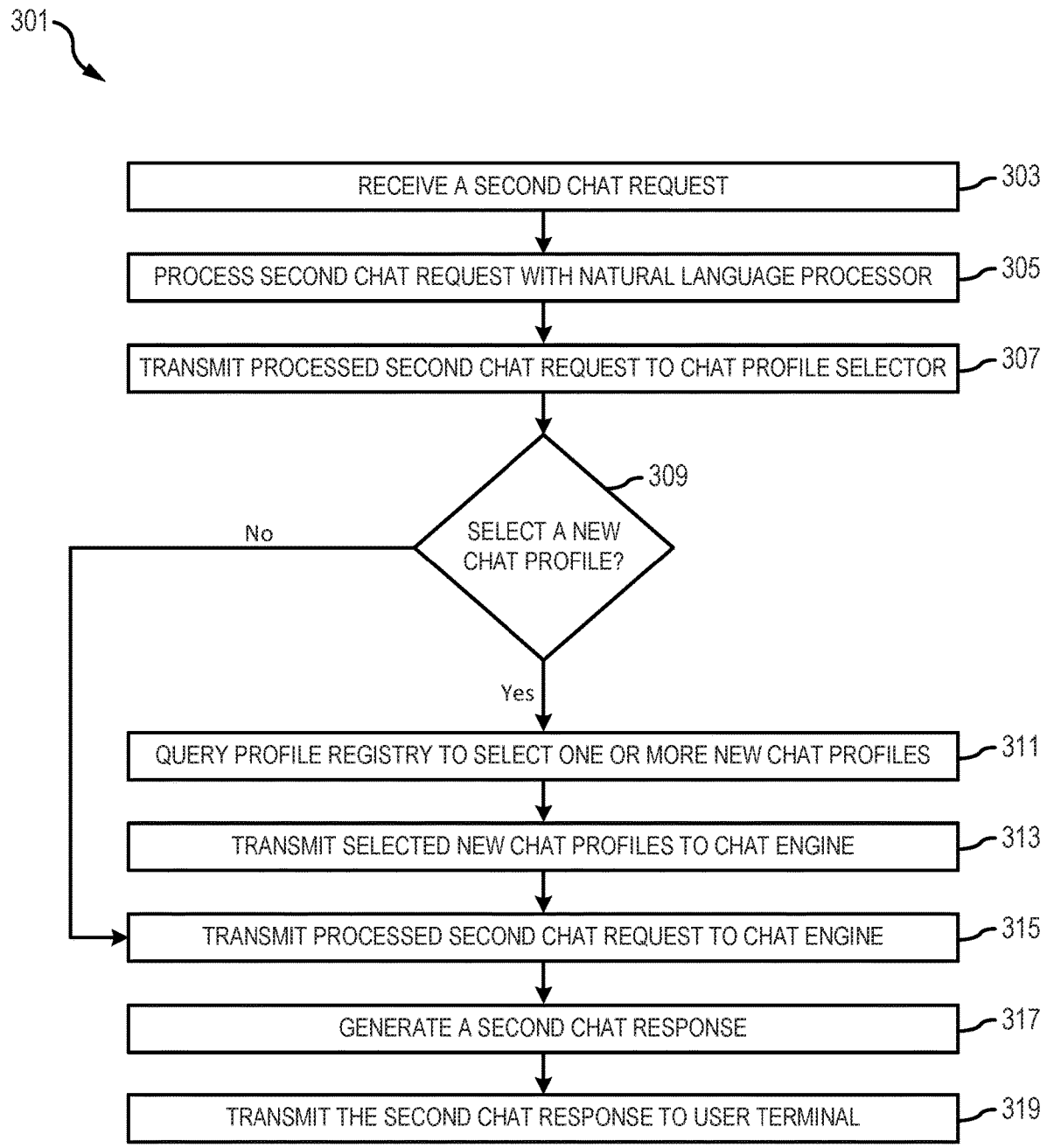
FIG. 3 illustrates a process flow for evaluating a selected chat profile in a multi-profile chat environment, in accordance with various embodiments.
Figure 4:
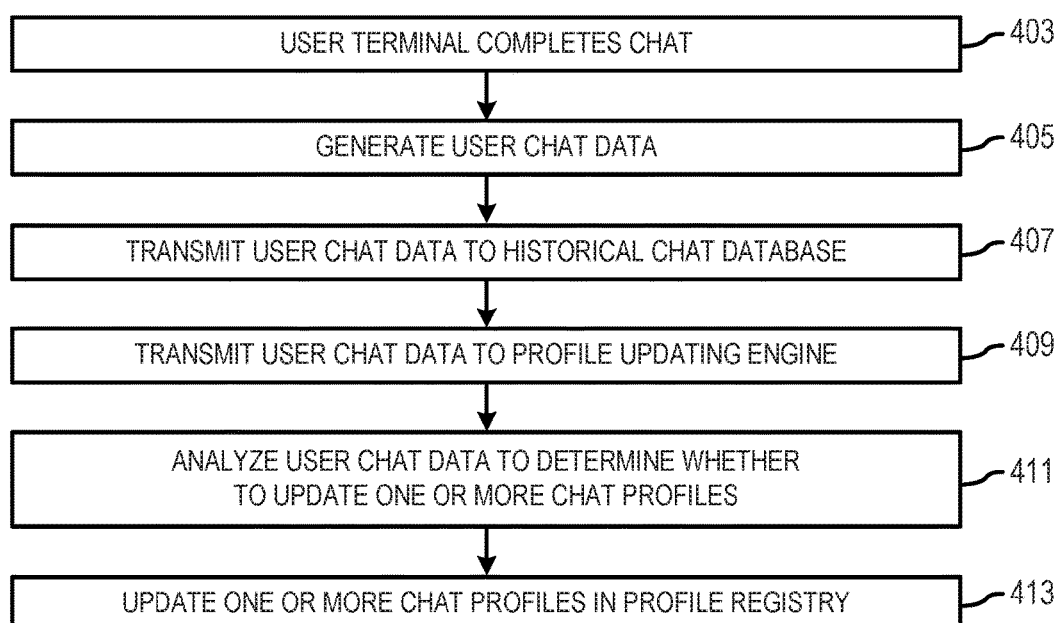
FIG. 4 illustrates a process flow for updating chat profiles in a multi-profile chat environment, in accordance with various embodiments.

Referring now to FIGS. 2-4, the process flows depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIGS. 2-4, but also to the various system components as described above with reference to FIG. 1.

In various embodiments, and with specific reference to FIG. 2, a method 201 of initializing one or more chat profiles in a multi-profile chat environment is disclosed. Multi-profile chat environment 101, via chat orchestrator 110, may receive a chat request 108 (step 203). User terminal 105 may transmit the chat request 108 to multi-profile chat environment 101 to initiate a chat. The chat request 108 may comprise any suitable format and be a textual, auditory, and/or visual input. The chat request 108 may comprise a user identifier and chat data. The user identifier may comprise data identifying the user interacting with user terminal 105, such as, for example, a username, a first name and/or last name, an account number, and/or the like. In various embodiments, the user identifier may be associated with the chat request 108 as metadata. The chat data may comprise the user's input into user terminal 105 during the generation of the chat request 108. For example, the chat data may comprise a statement (e.g., "I am receiving an error when accessing my account"), a question (e.g., "what is my current account balance?"), or any other suitable inquiry the user desires to receive help on.

Chat orchestrator 110 may process the chat request 108 via natural language processor (NLP) 120 (step 205). Chat orchestrator 110 may transmit the chat request 108 to NLP 120 for processing. NLP 120 may process chat request 108 using any suitable method, such as, for example, hard-coded rules, machine learning, artificial intelligence, or the like. For example, NLP 120 may process chat request 108 by searching for key words, phrases, and/or punctuation; executing one or more tasks or subtasks, such as, for example, part-of-speech tagging, parsing, word segmentation, terminology extraction, or the like; and/or using any other suitable language processing methodology known in the art. NLP 120 may process the chat request 108 to determine a chat profile request, a request topic, or a request sentiment. The chat profile request may be a direct request for a specific chat profile to be used during the chat (e.g., "I want to speak with Happy"). The request topic may indicate a general area of the request (e.g., technical problem, accounts receivable, travel rewards, etc.). The request sentiment may indicate the current attitude of the user (e.g., angry, happy, sarcastic, etc.). Chat orchestrator 110 may transmit the processed chat request to chat profile selector 130 (step 207).

In various embodiments, chat profile selector 130 may query historical chat database 115 to retrieve user chat data (step 209). Chat profile selector 130 may parse the processed chat request to determine the user identifier associated with the processed chat request. Chat profile selector 130 may query historical chat database 115 based on the user identifier to retrieve all user chat data associated with that user identifier. For example, chat profile selector 130 may retrieve a user profile and/or a user chat record from historical chat database 115. The user profile may comprise demographic data about the user, and/or any other desired personal information concerning the user. For example, in a financial transaction chat system, the user profile may comprise additional data regarding transaction accounts, credit limits, or the like. In various embodiments, chat profile selector 130 may retrieve the user profile from any other suitable source, such as, for example, an internal transaction account database, external databases, or the like. The user chat record may comprise data of past interactions the user identifier had with multi-profile chat environment 101. For example, the user chat record may indicate the historical sentiment of the user (e.g., the user is typically mad when submitting chat requests, etc.), historical topics of interest (e.g., the user typically transmits chat requests concerning technical problems, etc.), and/or the like. In various embodiments, the historical sentiment and historical topics of interest may be stored as metadata associated with each user each record.

In various embodiments, chat profile selector 130 may determine one or more chat profiles to select (step 211). A chat profile may comprise artificial intelligence driven by rules or instructions configured to control how chat responses 118 are generated. For example, each chat profile may correspond to a distinct personality, emotion, or specialty area, such as, for example, happy, sarcastic, empathetic, stern, age-driven (e.g., a "young" chat profile, a "teenager" chat profile, a "millennial" chat profile, an "old" chat profile, etc.), customer service, technical service, accounts receivable, travel (e.g., a travel agent, long distance travel, short distance travel, sea travel), food specialized chat profile, sports or other interest-based chat profile, and/or the like. In various embodiments, the chat profile may also comprise metadata (such as a chat profile ID), one or more chat templates (e.g., predefined sentences and phrases that the chat profile can use to dynamically insert words), profile usage data, and/or the like. Chat profile selector 130 may determine the chat profiles to select based on the processed chat request (e.g., the chat profile request, the request topic, and/or the request sentiment) and/or the user identifier (e.g., the user profile and/or the user chat record). For example, in response to the processed chat request indicating that a user is angry and sad, chat profile selector 130 may determine that an "empathetic" chat profile should be selected.

In various embodiments, chat profile selector 130 may select multiple chat profiles. For example, in response to the processed chat request indicating that the user is a 15 year old and needs help with a technical problem, chat profile selector 130 may determine that a "teenager" chat profile and a technical service chat profile should be selected. The multiple chat profiles may be employed similar to a group chat having multiple humans interacting with different personalities.

Chat profile selector 130 may query profile registry 135 to select one or more chat profiles (step 213). For example, chat profile selector 130 may comprise a chat profile list containing a list of the chat profiles contained within profile registry 135 (e.g., ordered by a chat profile ID, or similar identifier). Based on the chat profile determined in step 211 and the chat profile list, chat profile selector 130 may query profile registry 135 and retrieve the corresponding chat profile (e.g., based on the chat profile ID, or other similar identifier). Chat orchestrator 110 may transmit the processed chat request to chat engine 140 (step 215). For example, chat profile selector 130 may notify chat orchestrator 110 that one or more chat profiles were selected. In response to receiving the notification, chat orchestrator 110 may transit the processed chat request to chat engine 140. In various embodiments, chat orchestrator 110 may also be configured to transmit the processed chat request at any other suitable time, such as, for example after step 205. Chat profile selector 130 may transmit the selected chat profiles to chat engine 140 (step 217).

In various embodiments, chat engine 140 may generate a chat response 118 (step 219). Chat engine 140 may generate the chat response 118 based on the selected chat profiles and the processed chat request. For example, in response to the processed chat request prompting an inquiry (e.g., "What is my account balance?"), chat engine 140 may access any suitable internal system to retrieve an answer. Employing the artificial intelligence based rules and instructions from the chat profile, chat engine 140 may generate the chat response based on the retrieved answer and the chat profile. Chat engine 140 may transmit the chat response 118 to user terminal 105 (step 221).

In various embodiments, and with specific reference to FIG. 3, a method 301 of evaluating a selected chat profile in a multi-profile chat environment is disclosed. Multi-profile chat environment 101, via chat orchestrator 110, may receive a second chat request (step 303). The second chat request may be transmitted by user terminal 105 in response to receiving the chat response 118 from chat engine 140 (e.g., in step 221). In that respect, the second chat request may comprise a follow up question, statement, inquiry, a request to end the chat, and/or any other follow up to chat response 118. For example, in response to receiving the chat response 118, a user may interact with a chat interface to input the second chat request. In various embodiments, the second chat request may also comprise metadata, tags, or the like indicating that the second chat request is related to the (first) chat request 108 (e.g., a chat ID or the like). The second chat request may comprise any suitable format and be a textual, auditory, and/or visual input. The second chat request may comprise the user identifier and second chat data.

Chat orchestrator 110 may process the second chat request via NLP 120 (step 305). NLP 120 may process the second chat request similar to processing the chat request 108. For example, NLP 120 may process the second chat request to determine a chat profile request, a request topic, or a request sentiment. In that respect, NLP 120 may process the second chat request to determine whether the topic of the request or sentiment of the request has changed in comparison to the chat request 108. In various embodiments, NLP 120 may integrate logic to determine whether the topic of the request or sentiment of the request is not an exact match compared to the first topic and sentiment. For example, in response to the sentiment for the (first) chat request being "happy" and for the second chat request being "joyful," NLP 120 may determine that the sentiment has not changed. As a further example, in response to the sentiment for the (first) chat request being "happy" and for the second chat request being "angry," NLP 120 may determine that the sentiment has changed. Chat orchestrator 110 may transmit the processed second chat request to chat profile selector 130 (step 307).

Chat profile selector 130 may evaluate the processed second chat request to determine whether to select a new chat profile (step 309). For example, in response to the user sentiment changing in comparison to the first chat request (e.g., from happy to angry), chat profile selector 130 may determine that a new chat profile should be selected. As a further example, in response to the processed second chat request providing additional details regarding an error, inquiry, or the like, chat profile selector 130 may determine that a new chat profile is more applicable. In response to determining that a new chat profile should be selected, chat profile selector 130 may query profile registry 135 to select one or more new chat profiles (step 311). Based on the chat profile determined in step 309 and the chat profile list, chat profile selector 130 may query profile registry 135 and retrieve the corresponding chat profile. Chat profile selector 130 may transmit the selected new chat profiles to chat engine 140. In various embodiments, chat profile selector may also determine to select a second chat profile in a group chat function, wherein both the (first) chat profile and the second chat profile are employed.

In response to determining that a new chat profile should not be selected, chat profile selector 130 may transmit instructions to chat orchestrator 110 that no new chat profile is needed. Chat orchestrator 110 may transmit the processed second chat request to chat engine 140 (step 315).

Chat engine 140 may generate a second chat response (step 317). In various embodiments, wherein chat profile selector 130 determines in step 309 to select a new (e.g., second) chat profile, chat engine 140 may generate the second chat response based on the processed chat request and the new chat profile. Chat engine 140 may generate the second chat response similar to generating the (first) chat response 118 in step 219 (with brief reference to FIG. 2). In various embodiments, wherein chat profile selector 130 determines in step 309 to not select a new (e.g., second) chat profile, chat engine 140 may generate the second chat response based on the processed chat request and the chat profile originally selected in step 213 (with brief reference to FIG. 2). Chat engine 140 may generate the second chat response similar to generating the (first) chat response 118 in step 219 (with brief reference to FIG. 2). Chat engine 140 may transmit the second chat response to user terminal 105 (step 319). In that regard, steps 303-319 may repeat during the chat until the user, via user terminal 105, completes the chat, or until the chat is escalated to a live representative (e.g., in response to multi-profile chat environment 101 being unable to complete the chat request).

In various embodiments, and with specific reference to FIG. 4, a method 401 of updating chat profiles in a multi-profile chat environment is disclosed. User terminal 105 may complete a chat with multi-profile chat environment 101 (step 403). For example, user terminal 105 may close a web browser, mobile application or the like, or may otherwise close a chat interface to complete the chat. Chat orchestrator 110 may receive notification of the chat completing.

In response to the chat completing, chat orchestrator 110 may generate user chat data (step 405). The user chat data may comprise data corresponding to the chat, such as, for example, the chat profiles selected during the chat, the request sentiment, the chat request topic, a chat time (e.g., the total time the user was chatting with multi-profile chat environment 101), and/or the like. In various embodiments, the user chat data may also comprise survey data. For example, in response to completing the chat, chat orchestrator 110 may transmit a chat survey to user terminal 105. The chat survey may prompt the user to answer various questions about the chat, such as whether their request was resolved, a service rating, and/or the like. Chat orchestrator 110 may parse a chat survey response from user terminal 105 to add the survey data to the user chat data. Chat orchestrator 110 may transmit the user chat data to historical chat database 115 (step 407). Historical chat database 115 may store the user chat data based on the user identifier from user terminal 105, such that historical chat database 115 maintains a historical chat record of interactions the user identifier had with multi-profile chat environment 101.

In various embodiments, chat orchestrator 110 may transmit the user chat data to profile updating engine 150 (step 409). Profile updating engine 150 may analyze the user chat data to determine whether to update one or more chat profiles (step 411). Profile updating engine 150 may analyze the user chat data corresponding to each chat profile that was selected and used during the chat. Profile updating engine 150 may analyze the user chat data to determine the accuracy and efficiency of the chat profiles while the chat profile was in use. Profile updating engine 150 may analyze the user chat data using any technique, such as, for example, machine learning, big data analysis, a chat analysis, and/or the user chat record. Profile updating engine 150 may update one or more chat profiles stored in profile registry 135 (step 413). For example, profile updating engine 150 may query profile registry 135 based on each chat profile designated for updating. Profile updating engine 150 may update the chat profile and may store the updated chat profile in profile registry 135. In various embodiments, and as a further example, profile updating engine 150 may transmit the chat profile to be updated to an update queue for manual updating by a user. For example, and in accordance with various embodiments, in response to determining that a chat profile leads to a 95% chat failure rate (e.g., the user's request was not resolved), profile updating engine 150 may mark (e.g., via metadata or the like) the chat profile as "inactive" and may transmit a request for a manual review of the chat profile.

As used herein, "electronic communication" means communication of at least a portion of the electronic signals with physical coupling (e.g., "electrical communication" or "electrically coupled") and/or without physical coupling and via an electromagnetic field (e.g., "inductive communication" or "inductively coupled" or "inductive coupling"). As used herein, "transmit" may include sending at least a portion of the electronic data from one system component to another (e.g., over a network connection). Additionally, as used herein, "data" may include encompassing information such as commands, queries, files, data for storage, and the like in digital or any other form.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

The disclosure and claims do not describe only a particular outcome of employing multiple chat profiles in an automated chat environment, but the disclosure and claims include specific rules for implementing the outcome of employing multiple chat profiles in an automated chat environment and that render information into a specific format that is then used and applied to create the desired results of employing multiple chat profiles in an automated chat environment, as set forth in *McRO, Inc. v. Bandai Namco Games America Inc.* (Fed. Cir. case number 15-1080, Sep. 13, 2016). In other words, the outcome of employing multiple chat profiles in an automated chat environment can be performed by many different types of rules and combinations of rules, and this disclosure includes various embodiments with specific rules. While the absence of complete preemption may not guarantee that a claim is eligible, the disclosure does not sufficiently preempt the field of employing multiple chat profiles in an automated chat environment at all. The disclosure acts to narrow, confine, and otherwise tie down the disclosure so as not to cover the general abstract idea of just employing multiple chat profiles in an automated chat environment. Significantly, other systems and methods exist for employing multiple chat profiles in an automated chat environment, so it would be inappropriate to assert that the claimed invention preempts the field or monopolizes the basic tools of employing multiple chat profiles in an automated chat environment. In other words, the disclosure will not prevent others from employing multiple chat profiles in an automated chat environment, because other systems are already performing the functionality in different ways than the claimed invention. Moreover, the claimed invention includes an inventive concept that may be found in the non-conventional and non-generic arrangement of known, conventional pieces, in conformance with *Bascom v. AT&T Mobility*, 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

In various embodiments, the system and method may include alerting a subscriber when their computer is offline. With brief reference to FIG. 1, system 100 may include generating customized information and alerting a remote subscriber that the information can be accessed from their computer (e.g., user terminal 105). The alerts are generated by filtering received information, building information alerts and formatting the alerts into data blocks based upon subscriber preference information, via multi-profile chat environment 101, for example. The data blocks are transmitted to the subscriber's wireless device, which, when connected to the computer, causes the computer to auto-launch an application to display the information alert and provide access to more detailed information about the information alert. More particularly, the method may comprise providing a viewer application to a subscriber for installation on the remote subscriber computer; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a subscriber based upon the destination address and transmission schedule, wherein the alert activates the application to cause the information alert to display on the remote subscriber computer and to enable connection via the URL to the data source over the Internet when the wireless device is locally connected to the remote subscriber computer and the remote subscriber computer comes online.

In various embodiments, the system and method may include a graphical user interface for dynamically relocating/rescaling obscured textual information of an underlying window to become automatically viewable to the user (via user terminal 105). By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen (e.g., via user terminal 105); displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., chat request 108, chat response 118, etc.) to prevent a computer (e.g., user terminal 105) from being compromised, for example by being infected with a computer virus. The system may scan for example, electronic communications for malicious computer code and clean the electronic communication before it may initiate malicious acts. The system operates by physically isolating a received electronic communication in a "quarantine" sector of the computer memory on user terminal 105. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which thus forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, system 100 may also address the problem of retaining control over customers during affiliate purchase transactions, using a system for co-marketing the "look and feel" of the host web page with the product-related content information of the advertising merchant's web page. System 100 can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is re-directed to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer so that she effectively remains on the host web page to purchase the item without being redirected to the third party merchant affiliate.

Because such composite pages are visually perceived by the customer as associated with the host web page, they give the customer the impression that she is viewing pages served by the host. Further, the customer is able to purchase the item without being redirected to the third party merchant affiliate, thus allowing the host to retain control over the customer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

As used herein, "satisfy", "meet", "match", "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Terms and phrases similar to "associate" and/or "associating" may include tagging, flagging, correlating, using a look-up table or any other method or system for indicating or creating a relationship between elements. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

Phrases and terms similar to a "party" may include any individual, consumer, customer, group, business, organization, government entity, transaction account issuer or processor (e.g., credit, charge, etc.), merchant, consortium of merchants, account holder, charitable organization, software, hardware, and/or any other type of entity. The terms "user," "consumer," "purchaser," and/or the plural form of these terms are used interchangeably throughout herein to refer to those persons or entities that are alleged to be authorized to use a transaction account.

The computer system or any components may integrate with voice integration technology such as, for example, the ALEXA system developed by AMAZON®. ALEXA is a cloud-based voice service that can help you with tasks, entertainment, general information and more. All AMAZON® ALEXA devices, such as the AMAZON ECHO®, AMAZON ECHO DOT®, AMAZON TAP®, and AMAZON FIRE® TV, have access to the ALEXA system. The ALEXA system may receive voice commands via its voice activation technology, and activate other functions, control smart devices and/or gather information. For example, music, emails, texts, calling, questions answered, home improvement information, smart home communication/activation, games, shopping, making to-do lists, setting alarms, streaming podcasts, playing audiobooks, and providing weather, traffic, and other real time information, such as news. The ALEXA system may allow the user to access information about eligible accounts linked to an online account across all ALEXA-enabled devices.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

Distributed computing cluster may be, for example, a Hadoop® cluster configured to process and store big data sets with some of nodes comprising a distributed storage system and some of nodes comprising a distributed processing system. In that regard, distributed computing cluster may be configured to support a Hadoop® distributed file system (HDFS) as specified by the Apache Software Foundation at http://hadoop.apache.org/docs/. For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944,849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE® TV®, PANDORA®, XBOX®, SONY® PLAYSTATION®), a uniform resource locator ("URL"), a document (e.g., a MICROSOFT® Word® document, a MICROSOFT® Excel® document, an ADOBE®.pdf document, etc.), an "ebook," an "emagazine," an application or microapplication (as described herein), an SMS or other type of text message, an email, Facebook®, Twitter®, MMS, and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system may also include a main memory, such as for example random access memory (RAM), and may also include a secondary memory. The secondary memory may include, for example, a hard disk drive and/or a removable storage drive. The removable storage drive reads from and/or writes to a removable storage unit in a well-known manner. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS, EDB® Postgres Plus Advanced Server® (PPAS), etc.). In various embodiments, the server may include web servers (e.g. APACHE, IIS, GWS, SUN JAVA® SYSTEM WEB SERVER, JAVA Virtual Machine running on LINUX or WINDOWS).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS® OS, OS2, UNIX® OS, LINUX® OS, SOLARIS®, MacOS, and/or the like) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of the system may be implemented as micro-applications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and communicates a detected input from the hardware to the micro-app.

Any databases discussed herein, such as, for example, historical chat database 115 and/or profile registry 135 (with brief reference to FIG. 1), may include relational, hierarchical, graphical, blockchain, or object-oriented structure and/or any other database configurations. The databases may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), MongoDB®, Redis®, Apache Cassandra®, HBase by APACHE®, MapR-DB, or any other suitable database product. Moreover, the databases may be organized in any suitable manner, for example, as data tables or lookup tables. Each record may be a single file, a series of files, a linked series of data fields or any other data structure.

The blockchain structure may include a distributed database that maintains a growing list of data records. The blockchain may provide enhanced security because each block may hold individual transactions and the results of any blockchain executables. Each block may contain a timestamp and a link to a previous block. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. For more information on blockchain-based payment networks, see U.S. application Ser. No. 15/266,350 titled SYSTEMS AND METHODS FOR BLOCKCHAIN BASED PAYMENT NETWORKS and filed on Sep. 15, 2016, U.S. application Ser. No. 15/682,180 titled SYSTEMS AND METHODS FOR DATA FILE TRANSFER BALANCING AND CONTROL ON BLOCKCHAIN and filed Aug. 21, 2017, U.S. application Ser. No. 15/728,086 titled SYSTEMS AND METHODS FOR LOYALTY POINT DISTRIBUTION and filed Oct. 9, 2017, U.S. application Ser. No. 15/785,843 titled MESSAGING BALANCING AND CONTROL ON BLOCKCHAIN and filed on Oct. 17, 2017, and U.S. application Ser. No. 15/785,870 titled API REQUEST AND RESPONSE BALANCING AND CONTROL ON BLOCKCHAIN and filed on Oct. 17, 2017, the contents of which are each incorporated by reference in its entirety.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may then be designated as a key field in a plurality of related data tables and the data tables may be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with the system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device, or transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), HPE Format-Preserving Encryption (FPE), Voltage, and symmetric and asymmetric cryptosystems. The systems and methods may also incorporate SHA series cryptographic methods as well as ECC (Elliptic Curve Cryptography) and other Quantum Readable Cryptography Algorithms under development.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference. For example, representational state transfer (REST), or RESTful, web services may provide one way of enabling interoperability between applications.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE MQ™ (formerly MQSeries) by IBM®, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, JAVA®, JAVASCRIPT, JAVASCRIPT Object Notation (JSON), VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. Cryptography and network security methods are well known in the art, and are covered in many standard texts.

In various embodiments, the software elements of the system may also be implemented using Node.js®. Node.js® may implement several modules to handle various core functionalities. For example, a package management module, such as Npm®, may be implemented as an open source library to aid in organizing the installation and management of third-party Node.js® programs. Node.js® may also implement a process manager, such as, for example, Parallel Multithreaded Machine ("PM2"); a resource and performance monitoring tool, such as, for example, Node Application Metrics ("appmetrics"); a library module for building user interfaces, such as for example ReachJS®; and/or any other suitable and/or desired module.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, BLU-RAY, optical storage devices, magnetic storage devices, and/or the like.

The systems and methods are described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is intended to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of processing chat requests in a chat environment, comprising:
    updating, by the chat environment, a plurality of chat profiles based at least in part on a machine learning analysis of user chat data associated with a plurality of user identifiers;
    receiving, by the chat environment, a chat request;
    receiving, by the chat environment, historical user chat data associated with a user identifier corresponding to the chat request;
    receiving, by the chat environment, transaction account data associated with the user identifier;
    determining, by the chat environment, a chat profile from the plurality of chat profiles based at least in part on the historical user chat data and the transaction account data associated with the user identifier; and
    generating, by the chat environment, a chat response based at least in part on the chat request and the chat profile.

2. The method of claim 1, wherein the chat request comprises the user identifier, and wherein a user profile is retrieved based at least in part on the user identifier.

3. The method of claim 2, wherein the chat profile is determined based at least in part on the user profile.

4. The method of claim 1, further comprising:
    receiving, by the chat environment, a second chat request;
    processing, by the chat environment, the second chat request to determine at least one of a second chat profile request, a second request topic, or a second request sentiment;
    evaluating, by the chat environment, at least one of the second chat profile request, the second request topic, or the second request sentiment to determine whether to select a second chat profile from the plurality of chat profiles; and
    generating, by the chat environment, a second chat response based at least in part on the second chat request, wherein in response to selecting the second chat profile, the second chat response is generated based at least in part on the second chat profile.

5. The method of claim 4, wherein the second chat response is generated based at least in part on the chat profile.

6. The method of claim 1, further comprising:
    generating, by the chat environment, subsequent user chat data; and
    analyzing, by the chat environment, the subsequent user chat data to determine whether to update the chat profile, wherein in response to determining to update the chat profile the chat profile is updated based at least in part on the analyzed subsequent user chat data.

7. The method of claim 6, wherein the subsequent user chat data is analyzed based at least in part on the machine learning analysis.

8. A multi-profile chat system comprising:
a processor,
a tangible, non-transitory memory configured to communicate with the processor,
the tangible, non-transitory memory having instructions stored thereon that, in response to execution by the processor, cause the processor to perform operations comprising:
  updating, by the processor, a plurality of chat profiles based at least in part on a machine learning analysis of user chat data associated with a plurality of user identifiers;
  receiving, by the processor, a chat request;
  receiving, by the processor, historical user chat data associated with a user identifier corresponding to the chat request;
  receiving, by the processor, transaction account data associated with the user identifier;
  determining, by the processor, a chat profile from the plurality of chat profiles based at least in part on the historical user chat data and the transaction account data associated with the user identifier; and
  generating, by the processor, a chat response based at least in part on the chat request and the chat profile.

9. The multi-profile chat system of claim 8, wherein the chat request comprises the user identifier, and wherein a user profile is retrieved based at least in part on the user identifier.

10. The multi-profile chat system of claim 9, wherein the chat profile is determined based at least in part on the user profile.

11. The multi-profile chat system of claim 8, further comprising:
  receiving, by the processor, a second chat request;
  processing, by the processor, the second chat request to determine at least one of a second chat profile request, a second request topic, or a second request sentiment;
  evaluating, by the processor, at least one of the second chat profile request, the second request topic, or the second request sentiment to determine whether to select a second chat profile from the plurality of chat profiles; and
  generating, by the processor, a second chat response based at least in part on the second chat request, wherein in response to selecting the second chat profile, the second chat response is generated based at least in part on the second chat profile.

12. The multi-profile chat system of claim 11, wherein the second chat response is generated based at least in part on the chat profile.

13. The multi-profile chat system of claim 8, further comprising:
  generating, by the processor, subsequent user chat data; and
  analyzing, by the processor, the subsequent user chat data to determine whether to update the chat profile, wherein in response to determining to update the chat profile the chat profile is updated based at least in part on the analyzed subsequent user chat data.

14. The multi-profile chat system of claim 13, wherein the subsequent user chat data is analyzed based at least in part on the machine learning analysis.

15. An article of manufacture including a non-transitory, tangible computer readable storage medium having instructions stored thereon that, in response to execution by a computer based system, cause the computer based system to perform operations comprising:
  updating, by the computer based system, a plurality of chat profiles based at least in part on a machine learning analysis of user chat data associated with a plurality of user identifiers;
  receiving, by the computer based system, a chat request;
  receiving, by the computer based system, historical user chat data associated with a user identifier corresponding to the chat request;
  receiving, by the computer based system, transaction account data associated with the user identifier;
  determining, by the computer based system, a chat profile from the plurality of chat profiles based at least in part on the historical user chat data and the transaction account data associated with the user identifier; and
  generating, by the computer based system, a chat response based at least in part on the chat request and the chat profile.

16. The article of manufacture of claim 15, wherein the chat request comprises the user identifier, and wherein a user profile is retrieved based at least in part on the user identifier.

17. The article of manufacture of claim 16, wherein the chat profile is determined based at least in part on the user profile.

18. The article of manufacture of claim 15, further comprising:
  receiving, by the computer based system, a second chat request;
  processing, by the computer based system, the second chat request to determine at least one of a second chat profile request, a second request topic, or a second request sentiment;
  evaluating, by the computer based system, at least one of the second chat profile request, the second request topic, or the second request sentiment to determine whether to select a second chat profile from the plurality of chat profiles; and
  generating, by the computer based system, a second chat response based at least in part on the second chat request, wherein in response to selecting the second chat profile, the second chat response is generated based at least in part on the second chat profile.

19. The article of manufacture of claim 15, further comprising:
  generating, by the computer based system, subsequent user chat data; and
  analyzing, by the computer based system, the subsequent user chat data to determine whether to update the chat profile, wherein in response to determining to update the chat profile the chat profile is updated based at least in part on the analyzed subsequent user chat data.

20. The article of manufacture of claim 19, wherein the subsequent user chat data is analyzed based at least in part on the machine learning analysis.

* * * * *